May 4, 1954
J. E. CALDWELL
2,677,227
COTTON STRIPPER
Filed March 31, 1952
2 Sheets-Sheet 1
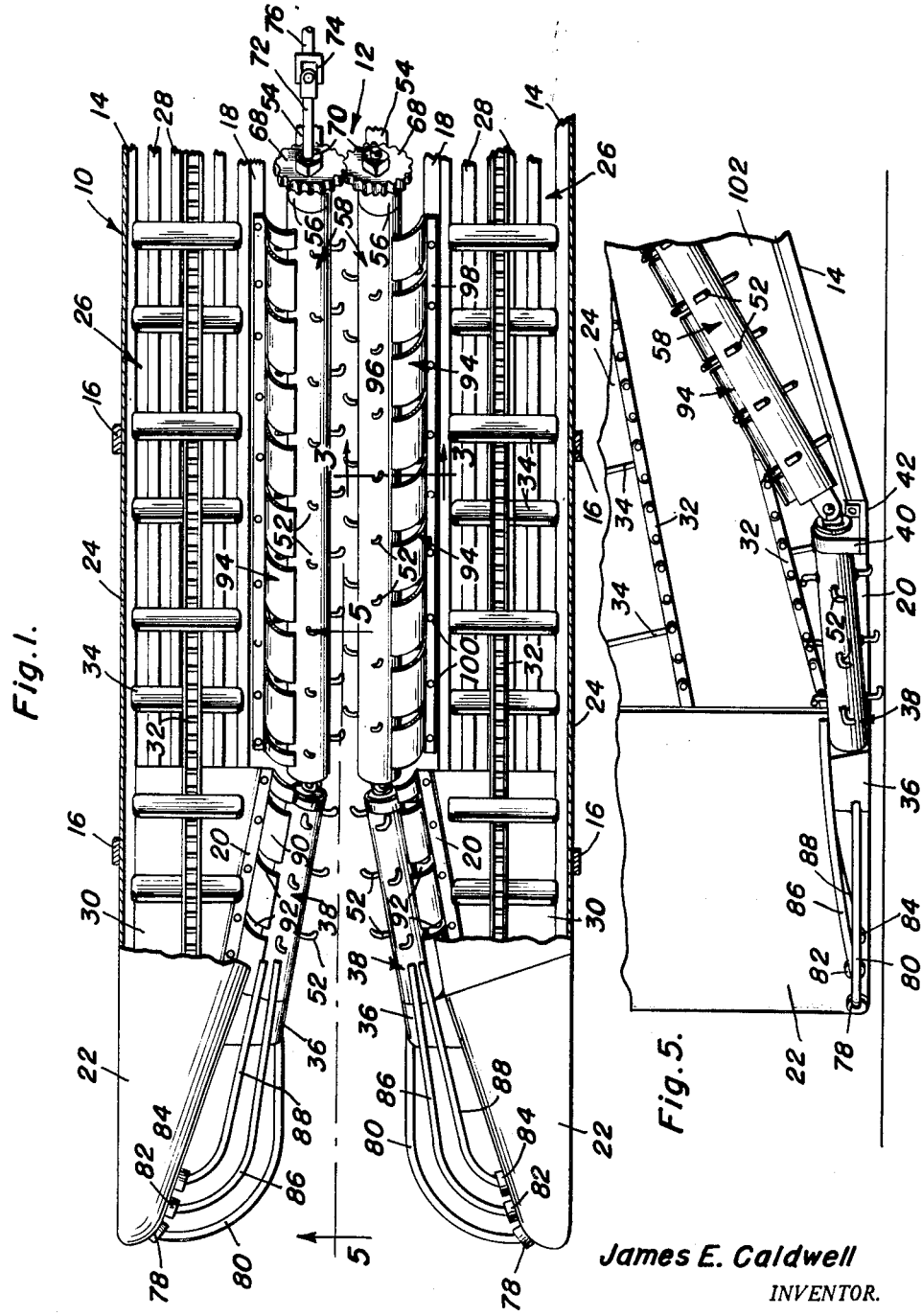
James E. Caldwell
INVENTOR.
BY
Attorneys May 4, 1954  J. E. CALDWELL  2,677,227
COTTON STRIPPER
Filed March 31, 1952  2 Sheets-Sheet 2
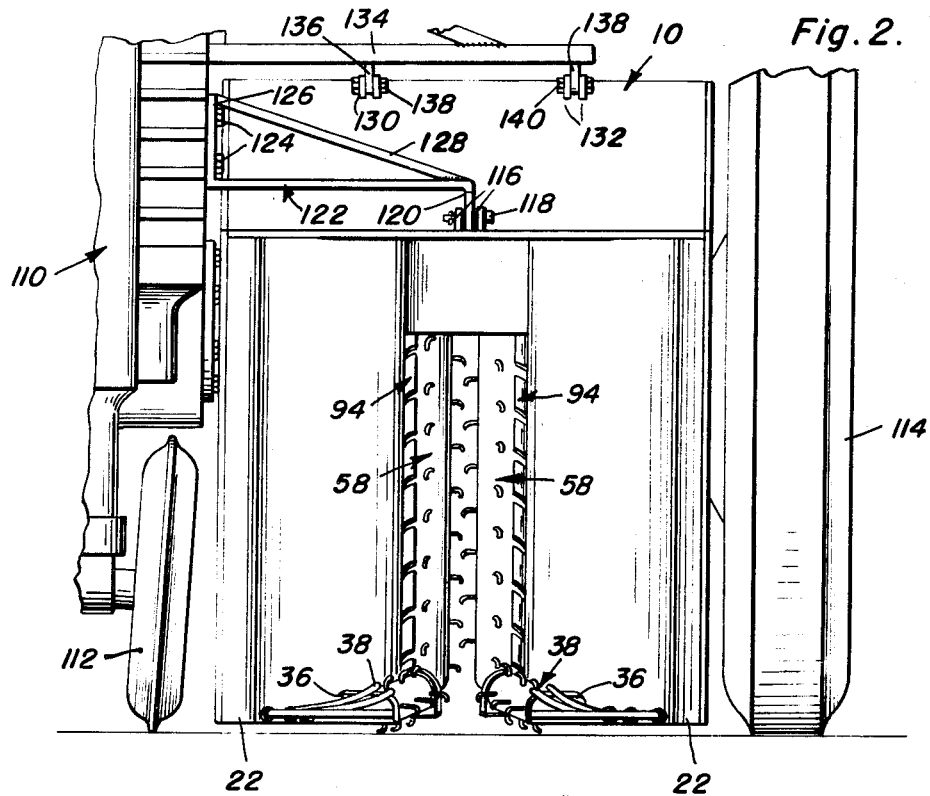
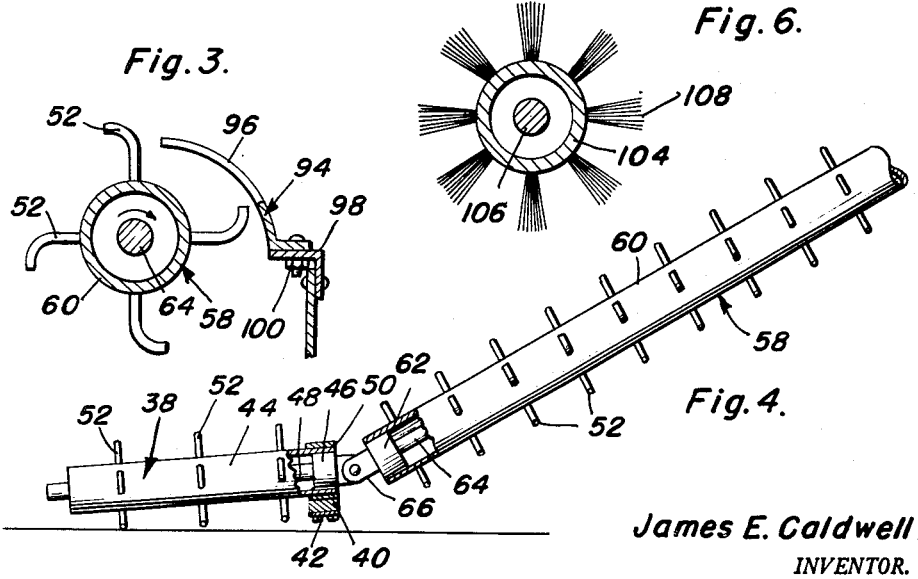
James E. Caldwell
INVENTOR.

Patented May 4, 1954

2,677,227

UNITED STATES PATENT OFFICE 2,677,227

COTTON STRIPPER

James E. Caldwell, Slaton, Tex.

Application March 31, 1952, Serial No. 279,614

1 Claim. (Cl. 56—35)

This invention relates in general to harvesters, and more particularly to stripping and conveying mechanism adapted to be attached to tractors for picking cotton.

The primary object of this invention is to provide an improved cotton picker which has incorporated therein a pair of rotatable rolls having cotton picker fingers thereon, said rolls each being divided into two sections disposed at different angles to the horizontal whereby all areas of cotton plants passing through the cotton picker are engaged by at least one of said picker fingers.

Another object of this invention is to provide an improved cotton picker adapted to be mounted at one side of a tractor and having cotton picking and conveying mechanism adapted to be driven by said tractor.

Another object of this invention is to provide an improved cotton picker including a frame having guide means at the forward end thereof for guiding cotton plants into engagement with cotton picking means, said cotton picking means including a pair of converging forward roll sections adapted to be disposed closely adjacent the ground and at a slight angle thereto in order to remove the lowermost cotton bolls from the cotton plants.

Another object of this invention is to provide an improved means for removing cotton from cotton picking fingers, said means including a transversely curved stripper plate partially overlying its adjacent roll and having notches therein for receiving stripper fingers, said stripper fingers having decreasing engagement with the notches of the stripper plates whereby cotton is gradually forced off the curved rear ends thereof.

Another object of this invention is to provide an improved cotton picker attachment for conventional tractors, said attachment being quickly and easily attached to and disengaged from the tractor.

A further object of this invention is to provide an improved cotton stripping roll, said roll being formed in two sections universally connected together, one of said sections being disposed at a slight angle to the horizontal and adapted to remove the lowermost cotton bolls from the cotton plants and the second section extending upwardly at a greater angle from the horizontal and adapted to engage the other portions of cotton plants.

With these objects definitely in view, this invention resides in certain novel features of construction, combination and arrangement of elements and portions as will be hereinafter described in detail in the specification, particularly pointed out in the appended claim, and illustrated in the accompanying drawings which form a material part of this application, and in which:

Figure 1 is a fragmentary top plan view of the cotton puller, the upper portion of the frame being broken away and shown in section in order to clearly illustrate the mechanism of the puller;

Figure 2 is a partial front elevational view of a conventional tractor having attached thereto the cotton puller of Figure 1;

Figure 3 is an enlarged transverse vertical sectional view taken substantially upon the plane indicated by the section line 3—3 of Figure 1 and showing the relationship of a stripper roll and its associated picker fingers with respect to a stripper plate for removing cotton from the picker fingers;

Figure 4 is an enlarged side elevational view of one of the stripper rolls, the universal connection between the two sections of the stripper roll being broken away and shown in section in order to clearly illustrate the details thereof;

Figure 5 is a partial longitudinal vertical sectional view taken substantially upon the plane indicated by the section line 5—5 of Figure 1 and showing the relationship of one of the stripper rolls with respect to its associated conveyor; and Figure 6 is an end elevational view, with parts broken away and shown in section through a modified form of stripper roll, said roll utilizing brushes as picker fingers.

Similar characters of reference designate similar or identical elements and portions throughout the specification and throughout the different views of the drawings.

Referring now to the drawings in detail, the cotton puller, which is the subject of this invention, is best illustrated in Figure 1 as including a frame generally referred to by the reference numeral 10 and cotton stripper mechanism generally referred to by the reference numeral 12. The frame 10 includes a pair of spaced parallel outer bottom frame members 14 which are connected to similar upper outer frame members (not shown) by vertically extending frame members 16. Spaced inwardly of the bottom longitudinally extending frame members 14 is a pair of inner longitudinally extending frame members 18 which are connected to the outer frame members 14 by conventional bracing (not shown). However, the inner frame members 18 do not lie in the same plane as the outer frame members 14 but slope upwardly from the horizontal at a much greater angle than the angle of slope of the outer frame members 14.

It will be noted that the inner bottom frame members terminate short of the forward end of the cotton puller and that frame members 20 continue forward as continuations thereof. The frame members 20 diverge forwardly and are connected at their forward ends to the forward ends of the longitudinally extending members 14. Supported by the frame members 14 and 20 are tapered guide snouts 22 which form the forward part of the cotton puller. It will be understood that the guide snouts 22 are hollow and that their sole purpose is to guide cotton plants into the cotton stripping mechanism 12. It will be noted that the side walls 24 of the cotton puller forms the outer side of the guide snouts 22 and extends rearwardly throughout the length of the cotton puller. The side walls 24 are secured to the vertical frame members 16 and are supported thereby.

Carried by the side walls 24 and the bottom outer frame members 14 is a pair of guideways 26 which are disposed immediately adjacent the side walls 24. Each guideway 26 includes a plurality of spaced parallel slats 28 which extend longitudinally of the guideway 26. As is best illustrated in Figure 1, the slats 28 terminate short of the forward end of the cotton puller and those portions of the guideways 26 immediately adjacent the guide snouts 22 are in the form of solid sheets 30.

Disposed in vertical alignment with each of the guideways 26 is a conveyor chain 32 journaled on suitable sprockets (not shown) for rotation by conventional drive means connected to one of the sprockets, preferably the rearmost sprocket. Secured to the outer side of the conveyor chain 32 is a plurality of transversely extending elevators 34 which engage the upper surface of the guideways 26 for moving cotton therealong through the rear of the cotton puller. Disposed at the rear of each of the guideways 26 are means for disposing of the cotton (not shown) which may be of any conventional type including blower means and conveyors.

Carried by the guide snouts 22 and extending inwardly therefrom adjacent their rear ends are journal housings 36 in which are rotatably supported front ends of stripping roll sections 38. The rear end of each front stripping roll section 38 is supported by a journal 40 mounted on an L-shaped support arm 42 carried by the frame member 20 at the rear end thereof.

Referring now to Figure 4 in particular, it will be seen that the front stripping roll section 38 is in the form of a length of tubing 44 having circular filler blocks 46 disposed in each end thereof. Extending between and through the filler blocks 46 is a shaft 48 whose forward end extends beyond the forward end of the tubing 44. The forward end of the shaft 48 is disposed within the journal 36 and rotatably supported thereby. The journal 40 has a large bearing opening 50 in which the rear end of the tubing 44 is received. Carried by the tubing 44 and rigidly secured to the outer surface thereof in spaced circumferential rows are cotton picker fingers 52. The cotton picker fingers 52 are generally L-shaped in outline and have their stems secured to the tubing 44 so that the legs thereof point in a direction opposite to the rotation of the roll section 38. Carried by the frame 10 adjacent the rear upper end thereof is a pair of supporting arms 54 which have secured at their forward ends journals 56. Extending between the journals 56 and the rear ends of the forward stripping roll sections 38 are main stripping roll sections 58. Referring once again to Figure 4, it will be seen that the main stripping roll sections 58 are of the same construction as the forward stripping roll sections 38 and each includes a long length of tubing 60. Each end of the tubing 60 is provided with a circular filler block 62 and an elongated length of shafting 64 which is rigidly secured to the filler block 62. The forward filler block 62 is connected to a universal coupling 66 which is, in turn, connected to the rear filler block 46 of the tubing 44 so as to universally connect together the forward stripper roll section 38 and the main stripper roll section 58. The tubing 60 is provided with a plurality of L-shaped cotton picker fingers 52 which are spaced therealong in the same manner as they are arranged on the tubing 44.

Referring now to Figure 1 in particular, it will be seen that the upper end of the shafting 64 of each of the main stripper roll sections 58 are rotatably journaled in the journals 56 and extend outwardly therethrough. The ends of the shafting 64 at the upper ends of the main stripper roll sections 58 extend beyond the journals 56 and are provided with intermeshing gears 68 which are connected on a shafting by conventional nuts 70. One of the shafting 64 is provided with an extension 72 which is connected by a universal coupling 74 to a conventional drive shaft 76 which may either be part of a power take-off system of a tractor or other intermediate drive shafting.

Referring now to Figures 1 and 5 in particular, it will be seen that carried by the forward end of each guide snout 22 is a fitting 78 to which is secured a curved guide rod 80 which extends rearwardly and has its rear end secured to the journal 36. Positioned in alignment with the fitting 78 are fittings 82 and 84 to which are connected rearwardly extending curved guide rods 86 and 88, respectively, the guide rods 86 and 88 having their rear ends overlying both the journals 36 and the forward ends of the stripper roll sections 38. It will be understood that as the cotton puller, which is the subject of this invention, moves forward the curved guide rods 80, 86 and 88 engage those portions of cotton plants which are lying adjacent the ground and tend to straighten the same and urge them up over the forward stripper roll sections 38.

In order that the forward stripper roll sections 38 may engage substantially all of the lower portions of cotton plants passing therebetween they are slanted upwardly at a slight angle as is best illustrated in Figures 4 and 5. The forward stripper roll sections 38 also converge rearwardly so as to insure that the cotton plants are guided therebetween and not underneath. As the cotton puller is moved forwardly, the forward stripper roll sections 38 are rotated toward each other and upwardly in order that the cotton picker fingers 52 may engage cotton bolls on the cotton plants.

Positioned adjacent each forward stripper roll section 38 in spaced parallel relation thereto is an elongated stripper plate 90 having a plurality of notches 92 therein permitting the passage of the respective cotton picker fingers 52. Cotton bolls which are engaged by the picker fingers 52 are forced into engagement with the stripper plates 90 and drop onto the sheet portion 30 of the guideway 26 adjacent the respective forward stripper roll section 38.

Each frame member 18 extends rearwardly in spaced parallel relation to the main stripper roll sections 58 and lies substantially in a plane passed through the axes thereof. As is best illustrated in Figure 3, each of the frame members 18 lies closely adjacent one of the main stripper roll sections 58 and has secured thereto a longitudinally extending stripper plate 94 having a plurality of notches 96 therein in alignment with the respective circumferential rows of cotton picker fingers 52. The stripper plate 94 is transversely curved and has extending along one edge thereof a flange 98. The longitudinally extending flange 98 overlies the associated frame member 18 and is secured thereto by conventional fasteners 100. It will be noted that the curved portion of the stripper plate 94 partially overlies its associated main stripper roll section 58 and is so arranged with respect thereto that the portion of the cotton picker finger 52 passing through the notch 96 is gradually decreased whereby cotton tangled with the picker finger 52 is gradually pushed off the rear end thereof.

Cotton removed by the stripper plates 94 falls upon the slots 28 of the guideways 26 and is removed to the rear of the cotton puller by the elevators 34 mounted on the conveyor chains 32. The slats 28 are so spaced that any debris other than cotton bolls will fall therethrough and be returned to the cotton fields. In order that cotton will not fall off the sides of the guideways 26, a vertical side panel 102 extends downwardly from the longitudinal frame member 18 adjacent each of the guideways 26 and forms the inner side wall thereof. Inasmuch as the main stripper roll sections 58 are disposed at a greater angle to the horizontal than the surfaces of the guideways 26, it is obvious that the side panels 102 are generally triangular in elevation.

Referring now to Figure 6 in detail, it will be seen that there is illustrated a modified form of stripper roller section which includes a section of tubing 104 mounted concentric about a shaft 106. The tubing 104 is provided with a plurality of radially extending brushes 108. The brushes 108 are intended to be substituted for the L-shaped fingers 52 and form cotton picker fingers.

While the sections of the stripper rolls have been illustrated and described in definite relationships, it will be understood that the angles between the various sections of the stripper rolls may be varied with respect to each other and to the horizontal. Also, it will be understood that the spacing between the various sections of the stripper rolls may also be varied.

Referring now to Figure 2 in particular, it will be seen that there is illustrated a portion of the left side of a conventional farm tractor which is referred to in general by the reference numeral 110. The farm tractor 110 includes a front wheel 112 and a rear wheel 114 in offset relation. It is intended that the cotton puller, which is the subject of this invention, be secured to a tractor such as the tractor 110 in alignment with the space between the front wheel 112 and the rear wheel 114.

In order that the cotton puller may be suitably secured to the tractor 110, its frame 10 is provided with a centrally located pair of upstanding mounting arms 116 at the forward end thereof. Secured between the mounting arms 116 by a conventional fastener 118 is a vertical flange 120 of a forward Z-shaped mounting bracket 122.

The other vertical flange of the Z-shaped mounting bracket 122 is secured to the frame of the tractor 110 by other conventional fasteners 124. Extending between the first vertical flange 120 and the second vertical flange 126 of the Z-shaped mounting bracket 122 is a diagonal brace 128 which is welded or otherwise secured to the flanges.

Disposed in spaced transversely aligned relation are two pairs of upstanding mounting arms 130 and 132. Carried by the tractor 110 is a rear supporting bracket 134 which has projecting downwardly intermediate the ends thereof a hanger 136 which is disposed between the mounting arms 130 and secured thereto by a conventional fastener 138. The rear supporting bracket 134 is also provided with a downwardly projecting hanger 138 adjacent the outer end thereof, the hanger 138 being disposed between the mounting arms 132 and secured thereto by a conventional fastener 140. Although the frame 10 of the cotton puller has been illustrated and described as being connected directly to the frame of the tractor 110, it will be understood that if it is so desired it may be connected to the hydraulic lift mechanism thereof. It will also be understood that a similar cotton puller may be secured to the right side of the tractor 110 in the same relative position.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claim.

Having described the invention, what is claimed as new is:

A cotton picker comprising a supporting frame, a pair of spaced cotton stripping rolls carried by said frame, each roll including a forward section and a main section universally joined together for simultaneous rotation, each of the forward sections sloping slightly upwardly and rearwardly, the main sections sloping upwardly and rearwardly at a greater angle than said forward sections, said forward sections being in rearwardly converging relation, said main sections being in spaced parallel relation, L-shaped picker fingers carried by said rolls for stripping cotton bolls from their respective plants, forward and main transversely curved stripper plates partially overlying said forward and main sections, respectively, said stripper plates having spaced notches for the passage of said picker fingers, a single section conveyor disposed adjacent each of said rolls for the reception of cotton bolls from associated forward and main stripper plates.

References Cited in the file of this patent

UNITED STATES PATENTS

| Number | Name | Date |
|---|---|---|
| 146,945 | Pedrick | Jan. 27, 1874 |
| 675,174 | Still | May 28, 1901 |
| 756,655 | Klampe | Apr. 5, 1904 |
| 1,105,235 | Appleby | July 28, 1914 |
| 1,809,542 | Bardsley et al. | June 9, 1931 |
| 2,001,077 | Thomann | May 14, 1935 |
| 2,406,058 | Boone | Aug. 20, 1944 |
| 2,471,771 | Parks et al. | May 31, 1949 |
| 2,503,128 | Neighbour et al. | Apr. 4, 1950 |